INVENTOR:
B. D. STANTON
BY: *Theodore E Beehler*
HIS ATTORNEY

INVENTOR:
B. D. STANTON
BY:
HIS ATTORNEY

United States Patent Office 3,452,774
Patented July 1, 1969

3,452,774
FLOW CONTROL FOR ADDING SMALL QUANTITIES OF MATERIAL TO A FLOWING STREAM
Benjiman D. Stanton, Walnut Creek, Calif., assignor to Shell Oil Company, New York, N.Y., a corporation of Delaware
Filed Feb. 16, 1965, Ser. No. 433,123
Int. Cl. G05d *11/04;* B67d *5/08*
U.S. Cl. 137—101.19                            11 Claims

ABSTRACT OF THE DISCLOSURE

A control system for accurately controlling the adding of material to a flowing stream. The system measures the flow in the stream and adds material in relation to the flow, with the amount of material added being determined by the loss in weight of a container filled with the material.

---

The present invention is particularly advantageous where one of the materials cannot be metered by conventional means. For example, where very small amounts of material are added to a much larger flowing stream, it is impossible to meter the small flow rates. Likewise, the physical properties of one material may render it impossible to meter the material. For example, normal flow measuring devices will not measure flow rates of highly viscous materials. Similarly, it is difficult to compensate for changes in the temperature of the material.

In process industries, for example, those related to the refining of petroleum products, it is often necessary to blend a small quantity of material with the material flowing in a pipeline or the like. For example, additives are added to gasoline to increase its octane number and to combat undesirable qualities in the refined gasoline. Normally, the quantity of additive added to the gasoline is very small, for example, in the range of cubic centimeters per barrel. Of course, at times quantities as large as barrels are added to barrels of the flowing stream. It has been the past practice to add additives by the batching process in which a known quantity of the additive is mixed with a known quantity of gasoline in a tank. Although this past procedure is satisfactory, the present trend in refineries is towards the use of automatic-in-line blending for the adding of additives.

In addition to adding additives to gasoline, materials are also added at various stages in the refining process. Likewise, in other chemical processes it is necessary to add quantities of materials to larger flowing streams. While the present invention is useful primarily for adding small quantities of liquids to flowing streams, it may easily be adapted to add solid materials to a process stream or large quantities to flow streams. In the case of pilot plants that are constructed to test various processes the flow rates become very small, i.e., on the order of cubic centimeters per hour.

The use of normal-in-line blending equipment for handling additive materials poses several problems as a result of the physical characteristics of the additives. First, the additives are usually quite expensive, and thus the quantities must be accurately measured. Second, the additives often have particular physical characteristics that make use of conventional metering equipment impossible. Third, the flow rates involved are normally so small that conventional flow meters will not provide accurate results. Fourth, it is important to know when the main flow stream fails in order that the flow of additives may be discontinued. Fifth, most flow measuring devices are viscosity and temperature sensitive, thus producing several problems that must be solved in order that the desired amount of additives may be added to the flow stream. Sixth, most flow metering devices are range limited, i.e., flow may only be varied over a 3:1 or 10:1 range.

The subject invention overcomes the above problems and difficulties by utilizing the loss-in-weight principle for adding the material to the flow stream. The flow in the main stream is measured with the measurement being converted to an appropriate signal. The flow signal is used to control both the flow in the stream as well as to set the level for adding the material. In addition, the system will also use fixed or manually set flow signals as a control input. The flow signal is multiplied by a constant with the product being supplied to an integrating device. The integrating device integrates the product of the constant times the flow rate to provide a set point for a controller. The set point for the controller is then compared with the signal representing the weight of the additive remaining in a metering tank. The controller in turn controls the rate of adding additive to maintain the proper ratio between the loss-in-weight of the additive in the metering tank and the set point as received from the integrating circuit.

In addition to the above features, the invention also utilizes a very small metering tank for holding the additive. The metering tank is provided with high and low level measuring devices that operate a switch circuit. The switch circuit in turn opens a dump valve to refill the metering tank from a larger storage tank. The dump valve is opened when the level in the metering tank reaches the low level and closed when it reaches the high level. During the refilling of the metering tank the invention provides a means for maintaining the controller at its last operating point prior to the refilling of the metering tank. In addition, the invention provides a circuit for resetting the integrator to an initial condition. When in initial conditions, the integrator will track with an opposite sign signal the signal received from the device that weighs the metering tank. After the refilling operation, the hold signal is removed from the controller, the integrator is placed in operation, and the system resumes its control of the adding of additive to the flow stream. Also, the tank is automatically tare weight compensated by the initial conditions circuit, thereby eliminating errors due to slow zero shifts or liquid clinging to the vessel sides.

The use of a small metering tank for holding the additive material provides increased accuracy. Normal weighing devices have an accuracy on the order of 1 part in 1000, thus the small metering tank increases the overall accuracy of the system. The use of a large storage tank in combination with an automatic filling system for filling the metering tank eliminates the need for frequent operator attention to fill the metering tank. As the empty time can be varied considerably, there is a wide flow range, i.e., 1000:1.

In addition, alarm circuits are provided for indicating when the integrator is not tracking the signal from the weighing device of the metering tank. Further, external circuits are provided for placing the controller in a hold position and the integrator in initial conditions or overriding the controller to shut down the complete system. Interlocks and safety devices are provided to prevent overflowing or running the metering tank dry.

The above objects of the present invention will be more easily understood from the following detailed description of a preferred embodiment taken in conjunction with the attached drawings in which.

Figure 1:
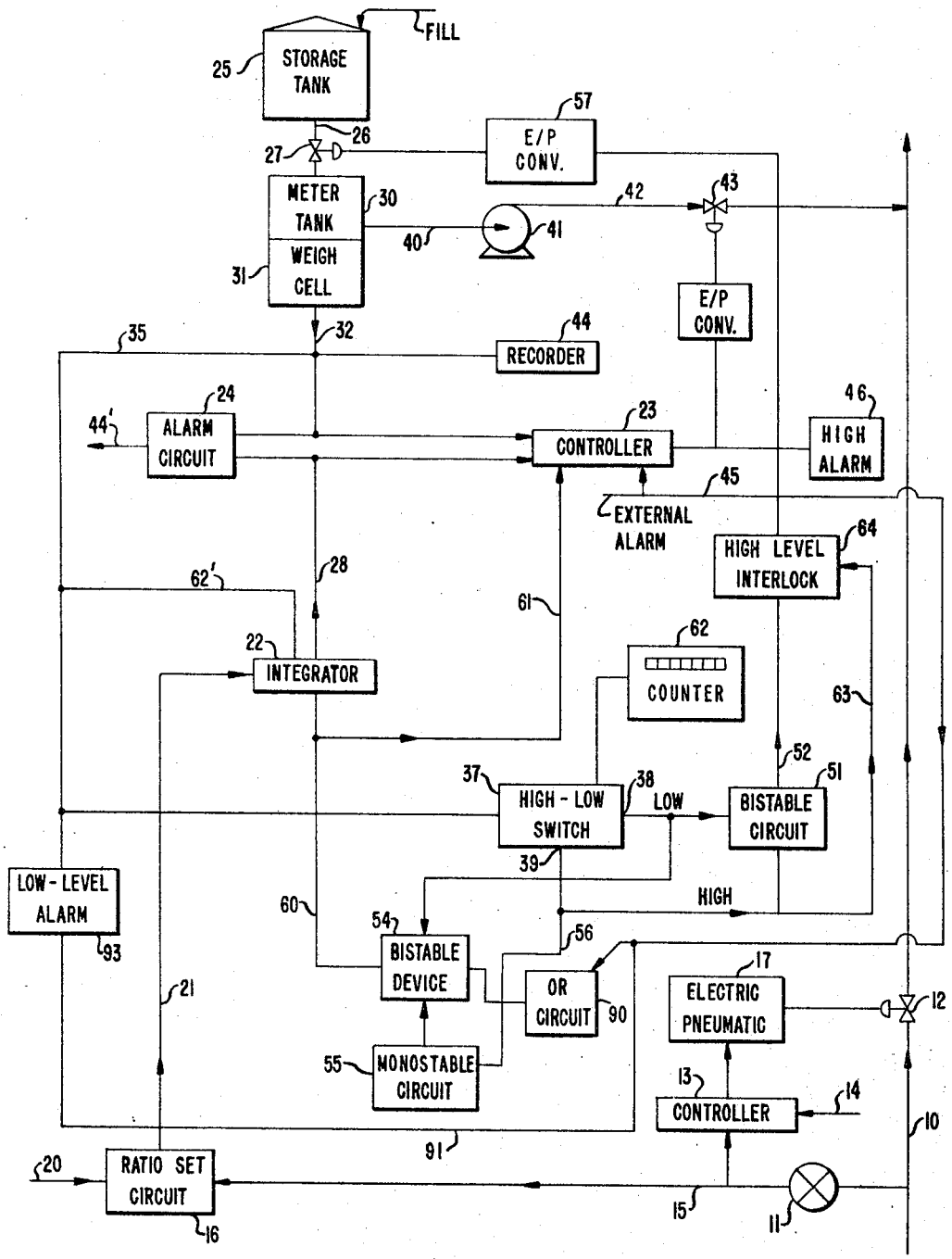
FIGURE 1 is a preferred embodiment of the invention in block diagram form.

Referring to the attached drawings, there is shown a main flow stream 10 in which there is flowing a fluid to which the additive is to be added. The term "small quantity" is used to refer to a quantity of less than one percent and preferably in the range of cubic centimeters per barrel of flow. An example of such a blending operation is the adding of tetraethyl lead to gasoline. The flow in the stream 10 is measured by a flow measuring means 11 that supplies an electrical signal related to the rate of flow or $dV/dt$. Of course, other types of signals may be accepted by the system and converted to an electrical signal. The related electrical signal is supplied by means of a lead 15 to a ratio-setting circuit 16 and to a controller 13. The controller 13 is preferably a standard process controller having proportional and integral control functions. The controller will compare the actual flow rate with the desired flow rate as indicated by the set point 14 and supply a related electrical signal. The electrical signal is supplied to a pneumatic converter 17 that converts the electrical signal to a related pneumatic signal. The pneumatic signal in turn is used to position a flow control valve 12.

The ratio-setting circuit 16 multiplies the rate of flow signal by a coefficient which may be manually or remotely set at the point 20. Thus, the output signal from the ratio-setting circuit has the form $KdV/dt$. The signal from the ratio-setting circuit 16 is supplied by means of a lead 21 to an integrator 22. The integrator 22 integrates the signal from the ratio-setting circuit and supplies it by means of a lead 28 to a common lead between the controller 23 and the alarm circuit 24. This signal now has the form of volume V.

A storage tank 25 is provided for holding a large bulk quantity of the additive that is to be supplied to the flow stream 10. The storage tank 25 can be a separate tank or a portion of a vessel used in a chemical process. For example, the storage tank 25 may be the bottom section of a distillation column. The main requirement for the storage tank 25 is to provide a large surge capacity for the system. The storage tank is connected by means of a conduit 26 to a small metering tank 30. A flow control means or dump valve 27 is disposed in the conduit 26. The metering tank 30 preferably has a relatively small volume when compared to the rate of supplying the additive to the flow stream 10. For example, a suitable size metering tank would contain approximately ½ to 4 hours' supply of additive material. The metering tank 30 is disposed on a weighing means, for example, a weigh cell 31, that continually determines the gross weight of the metering tank 30 plus material contained therein. The gross weight is supplied as an electrical signal by means of the lead 32. As is well known, all weighing means have a fixed accuracy, for example, an accuracy of 1 part in 1000. Thus, the use of a small tank greatly improves the accuracy of the overall system.

The signal from the weigh cell 31 is recorded on a recorder 44 that may be a simple pen recorder. In addition, as explained below, the number of times the metering tank 30 is refilled is also recorded. The combination of the number of refills plus the present weight of the metering tank 30 permits an operator determine the quantity of material added over a known time.

The tank 30 is equipped with an outlet that is coupled to the inlet of a pump 41 by conduit 40. The pump 41 is preferably a centrifugal pump that supplies sufficient pressure to permit the additive material to be injected into the main flow stream 10. The outlet of pump 41 is connected to the main flow stream 10 by means of conduit 42 having a flow control valve 43 disposed therein.

The signal from the weigh cell 31 is supplied by a lead 32 to a common lead connected to both the controller 23 and the alarm circuit 24. The alarm circuit 24 is designed to supply an output signal 44' whenever the integrating circuit 22 fails to track with an opposite sign the signal from the weigh cell 30. The output signal of the high alarm circuit 46 can be used to shut down the complete system as explained below or actuate a warning device. The controller 23 is a conventional process controller having the normal proportional and integral functions. In addition, the process controller 23 compares the gross weight of the metering tank 30 with the integrated value supplied by the lead 28 and controls the flow means 43 to vary the flow from the tank 30. The output signal of the controller 23 is also supplied to a high alarm circuit 46 that supplies an output signal whenever the controller signal exceeds a preset level.

In order to maintain an adequate supply of additive material in the metering tank, the weigh cell signal is used as a measurement of the level in the tank. The weigh cell signal is supplied by lead 35 to a high-low switch 37. The high-low switch 37 consists of two separate sections, each including an isolation circuit and biased amplifier. The amplifier of one section is set to be operated by a low voltage signal representing a low level in the tank while the other amplifier is set to be operated by a high voltage signal representing a high level in the tank. Each of the biased amplifiers is coupled to a relay, with the relays being adjusted to close when the amplifier conducts and open when the amplifier returns to a non-conducting condition. Thus, the high-low switch supplies a signal at 38 representing low level and 39 representing high level.

The leads 38 and 39 are coupled to a bistable circuit 51. The circuit 51 is of the flip-flop variety and when triggered by the low level signal 38 supplies an output signal 52 to the electric pneumatic converter 57. The electric pneumatic converter 57 in turn opens the dump valve 27 to supply material from the storage tank 25 to the metering tank 30.

The low level signal 38 is also supplied by means of a lead 53 to a bistable device 54. The bistable device 54 is of the flip-flop type that has two stable conditions of operation. The bistable device 54 is triggered to one state of operation by one input signal 38 and to its opposite or stable state by a second input signal that is received from circuit 55.

The bistable device 54 is coupled by means of a lead 60 to the integrator 22 and a lead 61 to the controller 23. The signal from the bistable device 54 places the integrator 22 in an initial condition and the controller in hold. When in the initial condition the integrating circuit 22 will track a signal from the weigh cell as supplied by a lead 62' with the opposite sign. Thus, the integrator 22 will continually follow the weigh cell signal and when the hold signal is removed will be in the proper state to resume control of the feeding of additive. The signal supplied by lead 61 to the controller 23 locks the controller 23 in a hold condition. In the hold position the controller 23 will maintain the valve 43 in its last position and continue to feed additive at the set rate.

When the high-low switch 37 supplies a signal at the point 39 it will be coupled by a lead 56 to a monostable circuit 55. The monostable circuit is preferably a monostable multivibrator that supplies an output signal when triggered and then returns to its initial or stable condition a preset time later. The output signal from the monostable multivibrator 55 is used to return the bistable device 54 to its initial or stable condition and removes hold from the controller 23 and initial conditions from integrator 22.

A fill counting device 62 is coupled to the high-low switch 37 to count the number of times the metering tank 30 is refilled. The device 62 may be a decade counter that is operated by the high level relay of the high-low switch 37 to count the number of times the metering tank is emptied or dumped.

The high level signal that appears at point 39 of the high-low switch 37 is also supplied by a lead 63 to a high level interlock 64. The high level interlock 64 is disposed in the connection between the bistable circuit 51 and the electric to pneumatic converter 57. The interlock 64 may be a second set of contacts on the high level relay of the high-low level switch 37. The interlock 64 functions to prevent the metering tank from overfilling in case the bistable circuit 51 fails to operate.

Figure 2:
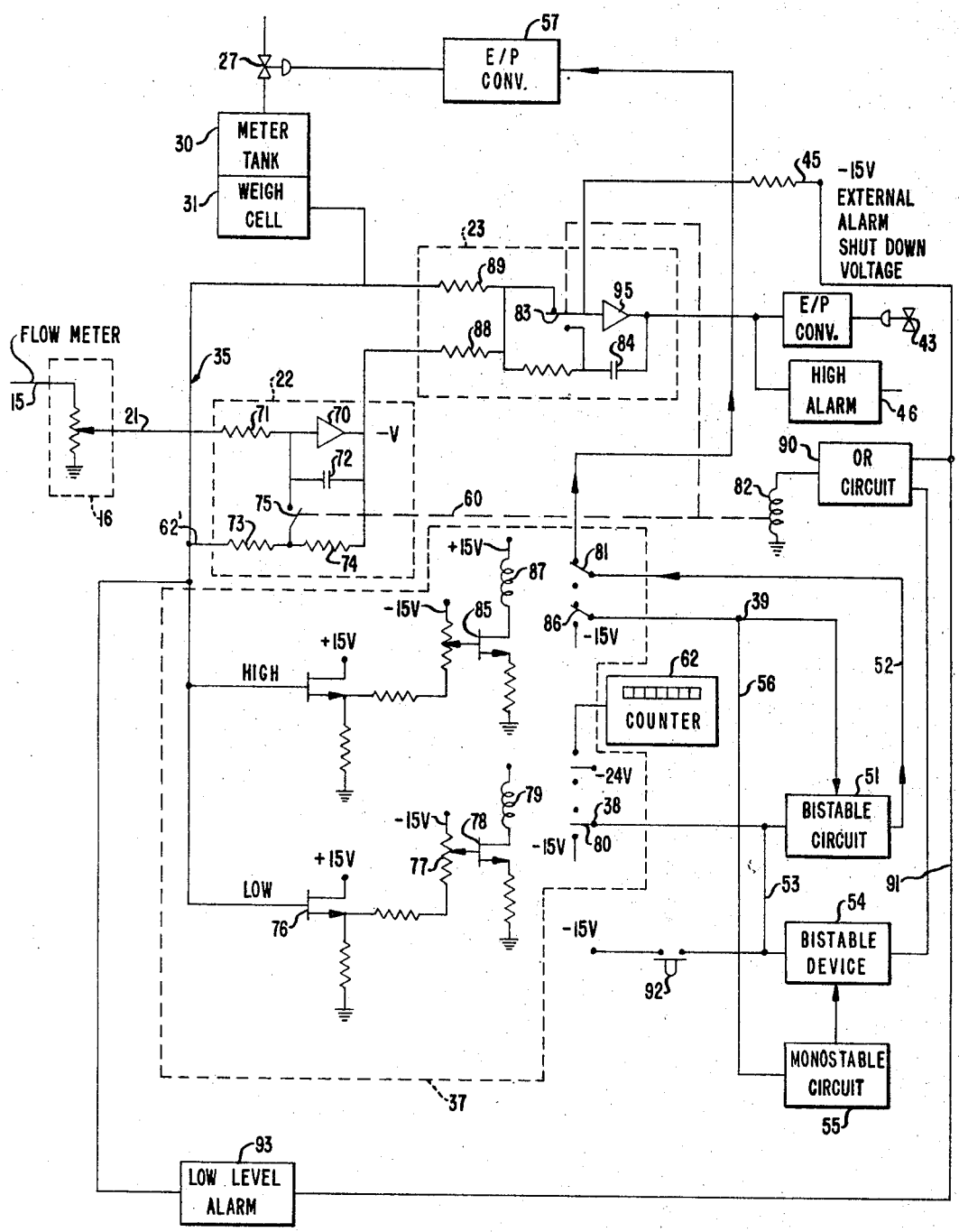
FIGURE 2 is a schematic drawing showing the circuit details of a portion of the system shown in FIGURE 1.

In FIGURE 2 there is shown the circuit details of integrating circuit 22, the controller 23 and high-low switch 38. In addition, there is shown the interlocking between these circuits and the various alarm circuits. The integrating circuit 22 utilizes an operational amplifier 70 having a resistance 71 disposed in its input circuit and a capacitance 72 disposed in its feedback circuit. Two additional equal value resistances 73 and 74 are coupled in series and placed in the feedback circuit. The common connection between the resistances 73 and 74 is coupled to the input of amplifier 70 by normally open relay contacts 75. The other end of resistance 73 is connected to lead 35 while the other end of resistance 74 is connected to the output side of the amplifier 70. Thus, when the contacts 75 are closed 73 will supply an input signal representing the gross weight of the metering tank 30 while 74 will supply a feedback for the amplifier. This will cause the integrator 22 to track the weigh cell signal with the opposite sign.

The high-low switch 37 consists of two identical circuits, one adjusted for the low level of the metering tank 30, the other for the high level. The low level consists of an emitter follower stage 76 and a single-stage biased amplifier stage 78. The power supplies are not shown in FIGURE 2, but the required power at each point is identified by the notation "+15V" or "−15V" that indicates the power required in volts. The bias on the amplifier 78 is adjusted by means of the variable potentiometer 77. The bias level is set to correspond to the desired low level of the metering tank 30. When this level is reached the amplifier 78 will conduct, thus energizing the relay coil 79 disposed in the collector circuit.

When the relay coil 79 is energized it will close the contacts 80 and supply a pulse to the bistable circuit 51. The pulse can be obtained from a power supply not shown in FIGURE 2. The bistable circuit 51 will operate and produce an output signal that will be supplied to the electric-pneumatic converter 57 to open the dump valve 27. The signal will be transmitted through the normally closed contacts 81 of the high level relay. The contacts 81 form the high level interlock 64 described above.

The signal from the low-level circuit is supplied by a lead 53 to the bistable circuit 54. When the bistable circuit 54 operates it will energize the relay coil 82 to close the contact 75, placing the integrating circuit in initial condition. The relay coil 82 also shifts contacts 83 to place the controller 23 in a hold condition. When the controller 23 is in a hold condition the input will be short-circuited, and the charge on capacitor 84 will be held. This will maintain the valve 43 in a fixed position depending on the charge on capacitor 84.

When the high-level single-stage biased amplifier 85 conducts it will energize relay coil 87 to close contacts 86 to transmit a pulse to the bistable circuit 51. The pulse will cause the bistable circuit to shift to its opposite state and remove the operating signal from the dump valve 27. The relay coil 87 will also open contacts 81, thus interrupting the circuit from the bistable circuit 51 to the dump valve 27.

The pulse from the closed relay contacts 86 will also be supplied by a lead 56 to the monostable circuit 55. This will cause the monostable circuit to operate and generate a pulse that returns the bistable circuit to its original state. When in its original state the bistable circuit will remove the power from relay coil 82. The de-energizing of relay coil 82 will open contacts 75 to place the integrator 22 in operation and shift contacts 83 to their original state to place the controller 23 in operation. When contacts 83 are shifted the integrator signal and weigh cell signal will be supplied to the operational amplifier 95 through equal resistances 88 and 89.

The external alarm shut down 45 will supply a steady voltage signal to the controller 23 and or circuit 90. The voltage signal is sufficient to cause the controller to close the valve 43 and energize the relay coil 82. When the relay coil 82 is energized the integrator 22 will be placed in initial condition, and the controller will be placed in a hold condititon. A low level alarm circuit 93 generates a second external alarm signal 91 that is supplied to the or circuit 90. This signal will only place the integrator 22 in an initial condition and the controller 23 in a hold condition. The low level alarm circuit can be identical to the low level circuit of the high-low switch 37 but biased to operate at a lower level. Of course, the alarm signal 91 could also be made of sufficient amplitude and supplied to the controller 23 in addition to the or circuit 90 to cause the controller to close the valve 43.

A push button 92 is provided for manually operating the dump valve 27. When the button 92 is closed it will supply a signal to operate the bistable circuit 51 and bistable device 54 to open the dump valve 27. The remainder of the circuit will operate as described above.

I claim as my invention:

1. A flow control system for adding quantities of a material to a large stream of fluid, said system comprising:
    a fluid flow stream;
    flow measuring means for measuring the flow in said stream and supplying a signal related thereto;
    a ratio setting circuit having a set point, said flow measuring means being coupled to said ratio setting circuit to multiply the signal representing flow by said set point;
    an integrating circuit, said ratio setting circuit being coupled to said integrating circuit to integrate the signal represening flow multiplied by the set point;
    a metering tank, a weigh cell, said metering tank being disposed on said weigh cell, said weigh cell supplying a signal related to the total weight of said metering tank plus its contents;
    an outlet on said metering tank, said outlet being connected to said fluid flow stream;
    a flow control emans disposed in the connection between said metering tank and said flow stream;
    a controller having at least proportional and integral actions, said weigh cell and said integrating circuit being coupled to said controller, said controller being coupled to said flow control means to control the flow from said metering tank to said flow stream in response to the signals received from said weigh cell and said integrating circuit.

2. The system of claim 1 and in addition:
    a storage tank, said storage tank being connected to said metering tank, a second flow control means disposed in the connection between said storage tank and said metering tank;
    a high-low switch means, said weigh cell being coupled to said switch means and said switch means being coupled to the second flow control means disposed in the connection between the storage and metering tanks, said switch means opening said second flow control means when the level in the metering tank falls to a low level and closing said second flow control means when said level rises to a high level.

3. The system of claim 2 including:
    a hold circuit, said hold circuit being coupled to said integrating circuit and said switch means to return said integrating circuit to an initial condition when the metering tank level reaches said high level.

4. The system of claim 2 including:
    an external alarm circuit, said alarm circuit being coupled to supply a steady external voltage to said controller to close the flow control means disposed in the connection between said metering tank and said flow stream.

5. The system of claim 2 and a hold circuit, said hold circuit being coupled to said switch means, said integrating circuit and said controller, said hold circuit being responsive to said switch means to place said controller in a hold condititon and said integrating circuit in an initial condition during the filling of said tank.

6. The system of claim 1 and an alarm circuit, said alarm circuit being coupled to said weigh cell and said integrating circuit and responsive to said weigh cell and said integrating circuit to supply an output signal.

7. In a flow control system operating on the loss-in-weight principle, said flow control system having a flow controller that is responsive to the flow in a stream to add a quantity of material to the stream in response to the flow in the stream, the improvement comprising:

a metering tank, said metering tank having a capacity in the range of one quarter to 10 hours' supply of material contained in the tank, said metering tank being connected to said stream to supply said material to said stream, said connection including said flow controller;

a storage tank, said storage tank having a capacity of several times said metering tank;

said storage tank being connected to said metering tank and a flow control means disposed in the connection between said storage and metering tanks;

a control means, said control means being responsive to the weight of said metering tank to fill said metering tank by opening said flow control means when said weight reaches a preset lower level and closing said flow control means when said weight reaches a pre-high level;

a hold circuit means, said hold circuit means being responsive to said control means and coupled to the flow controller to place the flow controller in a hold condition during the filling of said metering tank.

8. The system of claim 7 and in addition:

an initial condition circuit means, said initial condition circuit means being coupled to said hold circuit to return the flow control system to an initial condition corresponding to the filled metering tank.

9. In a flow control system operating on the loss-in-weight principle wherein the flow of material from a tank is controlled in response to the loss-in-weight of the tank, the improvement comprising:

a weighing means disposed to weigh said tank and supply a weight signal related thereto;

a controller having proportional and integral actions and an output signal, said controller also including flow control means disposed to control the flow of material from the tank;

a flow stream, said tank being in communication with said flow stream, a circuit responsive to the flow in said stream to supply a flow signal related to said flow;

said flow responsive circuit and said weighing means being coupled to said controller, said controller controlling the flow of material from said tank in response to said weight and flow signals;

filling means, said filling means being coupled to said tank whenever the level therein reaches a predetermined lower level; and hold circuit means, said hold circuit means being responsive to the filling of said tank to place said controller in a hold condition during the filling of said tank.

10. The system of claim 9 and in addition an initial condition circuit, said initial condition circuit being coupled to said controller to supply a flow signal related to an initial condition after the filling of said tank.

11. The system of claim 9 and a steady external alarm shut down voltage, said external alarm shut down voltage being coupled to said controller to shut down said control system.

References Cited

UNITED STATES PATENTS

| 2,925,197 | 2/1960 | Foebel | 222—57 X |
| 3,099,368 | 7/1963 | Turner et al. | 222—58 |
| 3,198,386 | 8/1965 | Hartley | 222—56 X |
| 3,217,927 | 11/1965 | Bale et al. | 222—56 |

ALAN COHAN, *Primary Examiner.*

D. J. ZOBKIW, *Assistant Examiner.*

U.S. Cl. X.R.

137—101.31; 222—56, 76